(12) United States Patent
Shinagawa

(10) Patent No.: US 9,360,817 B2
(45) Date of Patent: Jun. 7, 2016

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Kazutaka Shinagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/697,412

(22) Filed: Apr. 27, 2015

(65) Prior Publication Data

US 2015/0316884 A1  Nov. 5, 2015

(30) Foreign Application Priority Data

Apr. 30, 2014  (JP) ................. 2014-093603

(51) Int. Cl.
*G03G 15/00* (2006.01)
*H04N 1/23* (2006.01)

(52) U.S. Cl.
CPC ........... *G03G 15/553* (2013.01); *H04N 1/2346* (2013.01)

(58) Field of Classification Search
CPC .............. G03G 15/553; G03G 15/556; G03G 2215/0888
See application file for complete search history.

(56) References Cited

U.S. PATENT DOCUMENTS

| 5,237,372 A * | 8/1993 | Ishii ................... G03G 15/0822 399/30 |
| 2007/0177439 A1* | 8/2007 | Saito ......................... B41J 3/46 365/190 |
| 2009/0190937 A1 | 7/2009 | Willis |
| 2009/0297177 A1* | 12/2009 | Shimizu ............. G03G 15/0894 399/27 |
| 2010/0191620 A1 | 7/2010 | Sunata |
| 2012/0163839 A1 | 6/2012 | Oda |

FOREIGN PATENT DOCUMENTS

| EP | 1126391 A2 | 8/2001 |
| EP | 1927896 A1 | 6/2008 |
| JP | H10-133529 A | 5/1998 |
| JP | 2002-318508 A | 10/2002 |
| JP | 2005-148143 A | 6/2005 |
| JP | 2005-169939 A | 6/2005 |
| JP | 2005-300685 A | 10/2005 |
| JP | 2006-343621 A | 12/2006 |
| JP | 2008-135900 A | 6/2008 |

* cited by examiner

*Primary Examiner* — Sandra Brase
(74) *Attorney, Agent, or Firm* — Canon USA Inc., IP Division

(57) ABSTRACT

If a cartridge is a predetermined cartridge, change of a toner LOW threshold value is permitted. On the other hand, if the cartridge is not the predetermined cartridge, change of the toner LOW threshold value is inhibited.

20 Claims, 9 Drawing Sheets

IMAGE FORMING APPARATUS, METHOD FOR CONTROLLING IMAGE FORMING APPARATUS, AND STORAGE MEDIUM

BACKGROUND OF THE INVENTION

1. Field of the Invention

The present invention relates to an image forming apparatus, a method for controlling the image forming apparatus, and a storage medium.

2. Description of the Related Art

An image forming apparatus performs image forming on a sheet by using a recording material such as toner. Generally, the recording material is contained in a container such as a cartridge. Some image forming apparatuses detect the remaining amount of the recording material in the container and display its value on a display unit such as a user interface (UI).

Japanese Patent Application Laid-Open No. 2006-343621 discusses a conventional technique for calculating a predicted value of the remaining amount of toner based on a dot count value of raster data and then displaying the value as a current value of the remaining amount of toner at the time of image formation.

Meanwhile, in a toner LOW state where the remaining amount of toner is low, information indicating the toner LOW state or information for prompting a user to prepare a cartridge may be displayed. Japanese Patent Application Laid-Open No. 2002-318508 discusses a technique in which a user is able to arbitrarily change a threshold value for determining the toner LOW state, i.e., a toner LOW threshold value.

However, if the toner LOW threshold value can be changed at any time, a problem arises particularly in the following cases.

In a case where the remaining amount of toner is predicted based on the dot count, the amount of toner consumption is calculated by multiplying the dot count value by a toner consumption coefficient that indicates the amount of toner consumption per dot. An appropriate value is preset as the toner consumption coefficient, assuming a case where printing is performed by using a predetermined cartridge containing a predetermined toner.

However, if printing is performed by using a cartridge different from the thus assumed cartridge, the toner is consumed at a rate different from the preset toner consumption coefficient, often resulting in low accuracy of toner prediction.

In such a situation, it does not make much sense to make the toner LOW threshold value changeable. In many cases, the user changes the toner LOW threshold value because the user desires to improve the accuracy of toner LOW detection. If the accuracy of toner prediction is low in the above-described situation in the first place, changing the toner LOW threshold value does not sufficiently improve the accuracy of toner LOW detection.

SUMMARY OF THE INVENTION

The present invention is directed to suitably controlling whether to change a toner LOW threshold value.

According to an aspect of the present invention, an image forming apparatus includes an image forming unit configured to perform image formation using a recording material, a notification unit configured to notify a user when a remaining amount of the recording material has reached a threshold value, a change unit configured to change the threshold value according to an instruction from a user, and a control unit configured to permit the change unit to change the threshold value if a container containing the recording material is a predetermined container, and to restrict the change unit from changing the threshold value if the container containing the recording material is not the predetermined container.

An exemplary embodiment of the present invention can suitably control whether to change the toner LOW threshold value.

Further features of the present invention will become apparent from the following description of exemplary embodiments with reference to the attached drawings.

DESCRIPTION OF THE EMBODIMENTS

Figure 1:
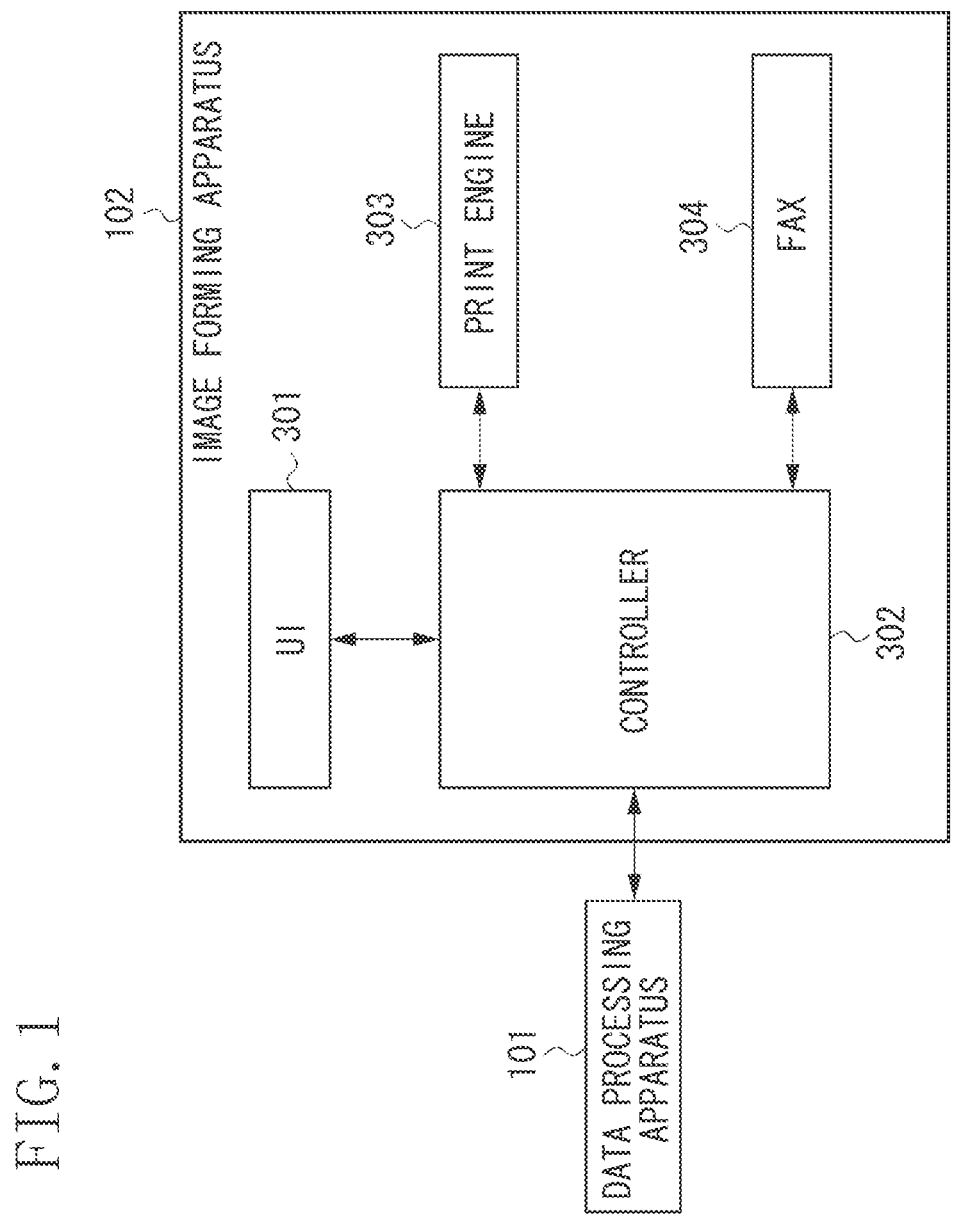
FIG. 1 is a block diagram illustrating a configuration of an image forming apparatus.

FIG. 1 is a block diagram illustrating a configuration of an image forming apparatus.

A data processing apparatus 101 (e.g., a personal computer (PC)) generates image data and transmits the generated image data to an image forming apparatus 102.

The image forming apparatus 102 (e.g., a laser printer) receives image data from the data processing apparatus 101, and performs image formation on a sheet based on the received image data. Further, the image forming apparatus 102 receives facsimile data from a facsimile apparatus (not illustrated) and performs image formation on a sheet based on the received facsimile data. The image forming apparatus 102 may be a multifunction peripheral having a scanner function.

A user interface (UI) 301 includes a display unit for providing various information to a user, and an operation unit for receiving various operations from the user. The display unit displays the current value of the remaining amount of toner (described below). The current value of the remaining amount of toner may be transmitted to an external apparatus such as the data processing apparatus 101 via an external interface (I/F) and then displayed on a display unit of the external apparatus such as the data processing apparatus 101.

A controller 302 generates bit map data based on page description language (PDL) data, and transmits the generated bit map data to a print engine 303. The controller 302 will be described in detail below with reference to FIG. 2.

Based on the bit map data received from the controller 302, the print engine 303 performs image formation on a sheet by using toner through the electrophotographic process. The image formation process is not limited to the electrophotographic process, and may be the ink-jet process, for example.

The electrophotographic process uses toner as a recording material, while the ink-jet process uses ink as a recording material.

A facsimile (FAX) 304 performs facsimile reception of compressed image data via a telephone line, and transmits the compressed image data to the controller 302. The FAX 304 further receives compressed image data transferred from the controller 302, and performs facsimile transmission of the compressed image data via the telephone line. In some models, the facsimile function is not provided hardwarewise, or is provided but deactivated and inoperable.

Although the controller 302, the print engine 303, and the FAX 304 are separate units, they may be integrally configured as one unit.

Figure 2:
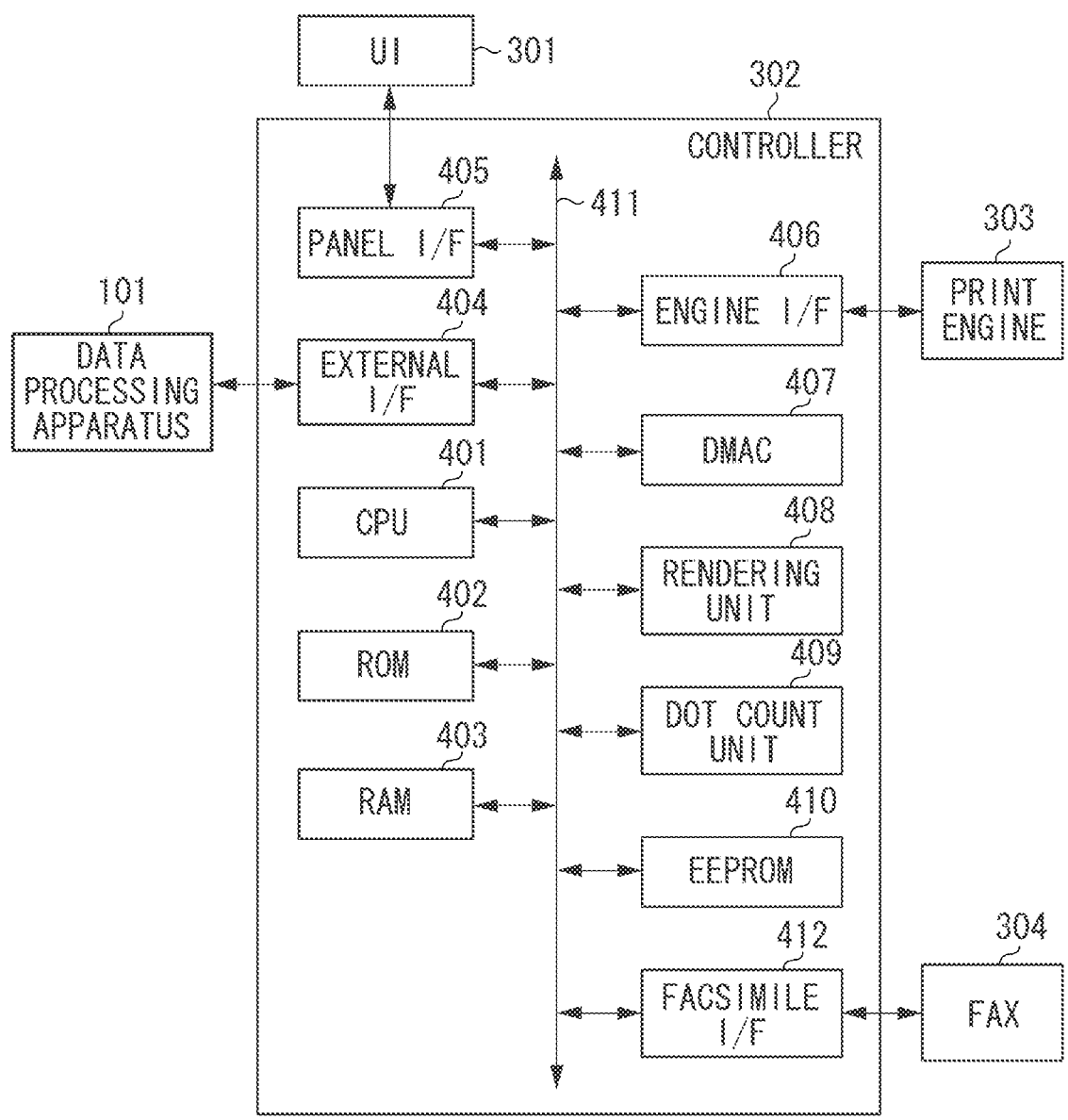
FIG. 2 is a block diagram illustrating a configuration of a controller.

FIG. 2 is a block diagram illustrating a configuration of the controller 302.

A central processing unit (CPU) 401 loads a program stored in a read only memory (ROM) 402 into a random access memory (RAM) 403, and executes the program to control the image forming apparatus 102. As described below, the CPU 401 calculates the remaining amount of toner based on a predicted value of the amount of toner consumption obtained by converting the dot count counted by a dot count unit 409, and on a sensor value of the remaining amount of toner provided by the print engine 303. Then, the CPU 401 displays the calculated remaining amount of toner on the UI 301 via a panel I/F 405, and notifies the data processing apparatus 101 of the value via an external I/F 404. Further, as described below, the CPU 401 also selects whether to provide a function of changing a toner LOW condition.

The ROM 402 stores a program to be executed by the CPU 401.

The RAM 403 stores a program loaded from the ROM 402. The RAM 403 further stores PDL data, intermediate data generated by interpreting the PDL data, bit map data generated by rendering the intermediate data, facsimile data, and other temporary data, such as processing statuses and log information, required for processing.

The external I/F 404 interconnects the data processing apparatus 101 and the controller 302, and relays data communication, i.e., data transmission and reception between them.

The panel I/F 405 interconnects the UI 301 and the controller 302, and relays data communication, i.e., data transmission and reception between them.

The engine I/F 406 interconnects the print engine 303 and the controller 302, and relays data communication, i.e., data transmission and reception between them.

A direct memory access controller (DMAC) 407 receives a command from the CPU 401, and performs data access to the RAM 403, i.e., writes and reads data to/from the RAM 403.

A rendering unit 408 rasterizes the intermediate data into bit map data.

The dot count unit 409 counts the number of dots which consume toner during image formation out of the dots contained in the bit map data. More specifically, the number of dots of non-white colors is counted. For example, in the case of monochrome printing, the number of dots corresponding to black (K) is counted. In the case of color printing, the number of dots corresponding to any one of yellow (Y), magenta (M), cyan (C), and black (K) is counted. Alternatively, the CPU 401 or the rendering unit 408 may count the number of dots. Some models are not provided with the dot count function and therefore are not able to predict the remaining amount of toner. Other models predict the remaining amount of toner based on the page count instead of the dot count.

An electrically erasable programmable read only memory (EEPROM) 410 stores setting information of the image forming apparatus 102, for example.

A bus 411 interconnects each component in the controller 302.

A facsimile I/F 412 interconnects the FAX 304 and the controller 302, and relays data communication, i.e., data transmission and reception between them.

Figure 3:
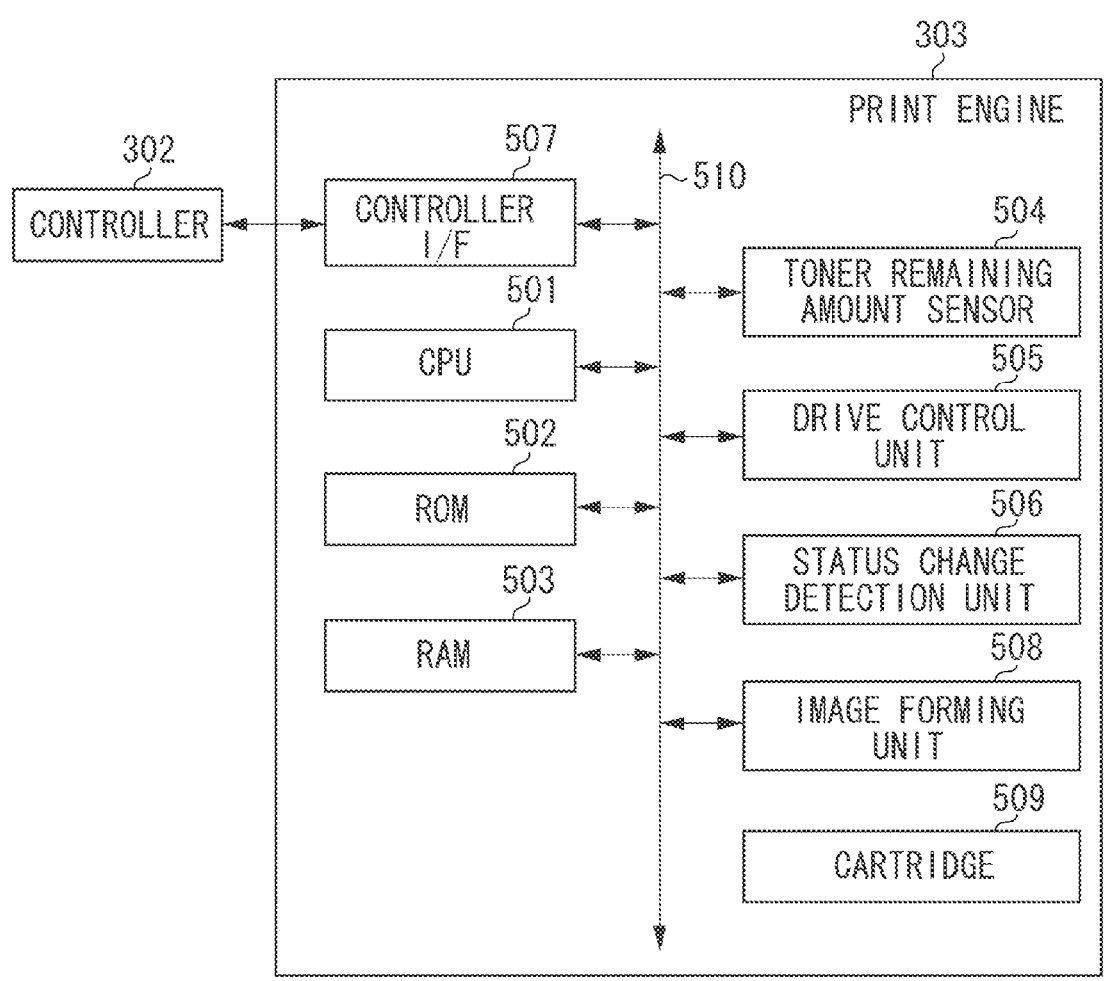
FIG. 3 is a block diagram illustrating a configuration of a print engine.

FIG. 3 is a block diagram illustrating a configuration of the print engine 303.

A CPU 501 loads a program stored in a ROM 502 into a RAM 503, and executes the program to control the print engine 303.

The ROM 502 stores a program to be executed by the CPU 501.

The RAM 503 stores a program loaded from the ROM 502.

A toner remaining amount sensor 504 measures the remaining amount of toner contained in a cartridge 509. Methods for sensors to detect the remaining amount of toner include the magnetic permeability detection method, the magnetic method, the piezoelectric vibration method, and the transmitted light method. For example, when the remaining amount of toner has reached a predetermined value, such as 20% and 0%, the toner remaining amount sensor 504 detects these values as a sensor value. More specifically, the sensor value is 100% if the remaining amount of toner is from 100% to 21%, 20% if the remaining amount of toner is from 20% to 1%, and 0% if the remaining amount of toner is 0%. A sensor may also be provided in the cartridge 509.

A drive control unit 505 drives various motors required when the image forming unit 508 performs image formation.

A status change detection unit 506 detects a status change in the image forming apparatus 102, such as jamming and cover opening. The status change detection unit 506 further detects the replacement of the cartridge 509. Alternatively, the CPU 501 may detect the status change.

A controller I/F 507 interconnects the controller 302 and the print engine 303, and relays data communication, i.e., data transmission and reception between them.

Based on the bit map data received from the controller 302, the image forming unit 508 performs image formation on a sheet by using toner through the electrophotographic process.

The cartridge 509 serves as a container containing toner. The cartridge 509 is what is called a process cartridge which is installable into the image forming apparatus 102. The cartridge 509 contains toner to be used by the image forming unit 508 to perform image formation. The cartridge 509 includes a nonvolatile storage medium in which cartridge information is stored. The cartridge information includes information indicating whether the cartridge 509 is new, color information indicating the color of the cartridge 509, toner remaining amount information indicating the current remaining amount of toner in the cartridge 509, and cartridge manufacturer information. Although the cartridge 509 is connected to the bus 510, it may be connected with the CPU 501 via an exclusive line.

The bus 510 interconnects each component in the print engine 303.

Figure 4:
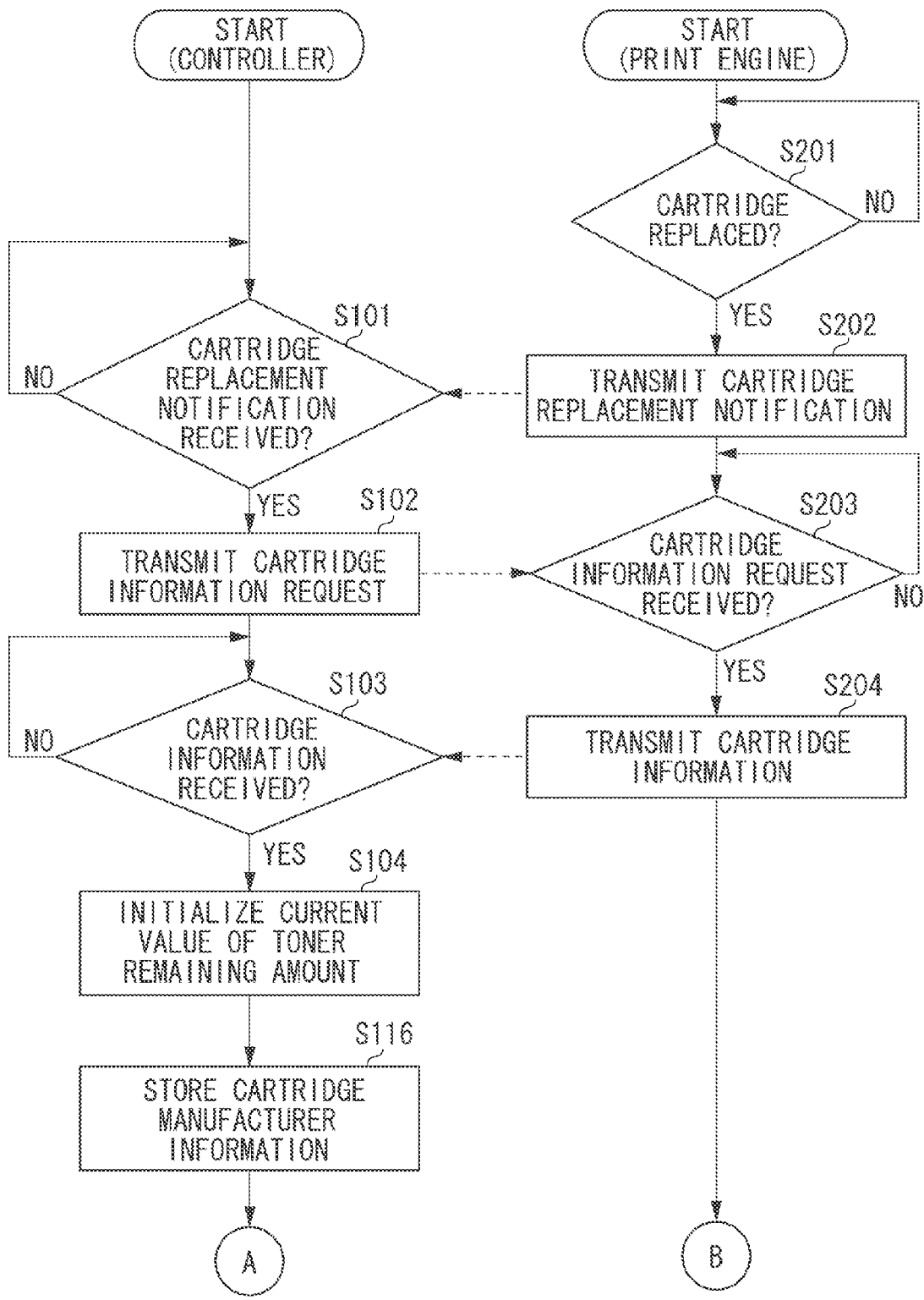
FIG. 4 is a flowchart (first half) illustrating control for detecting the remaining amount of toner.
Figure 5:
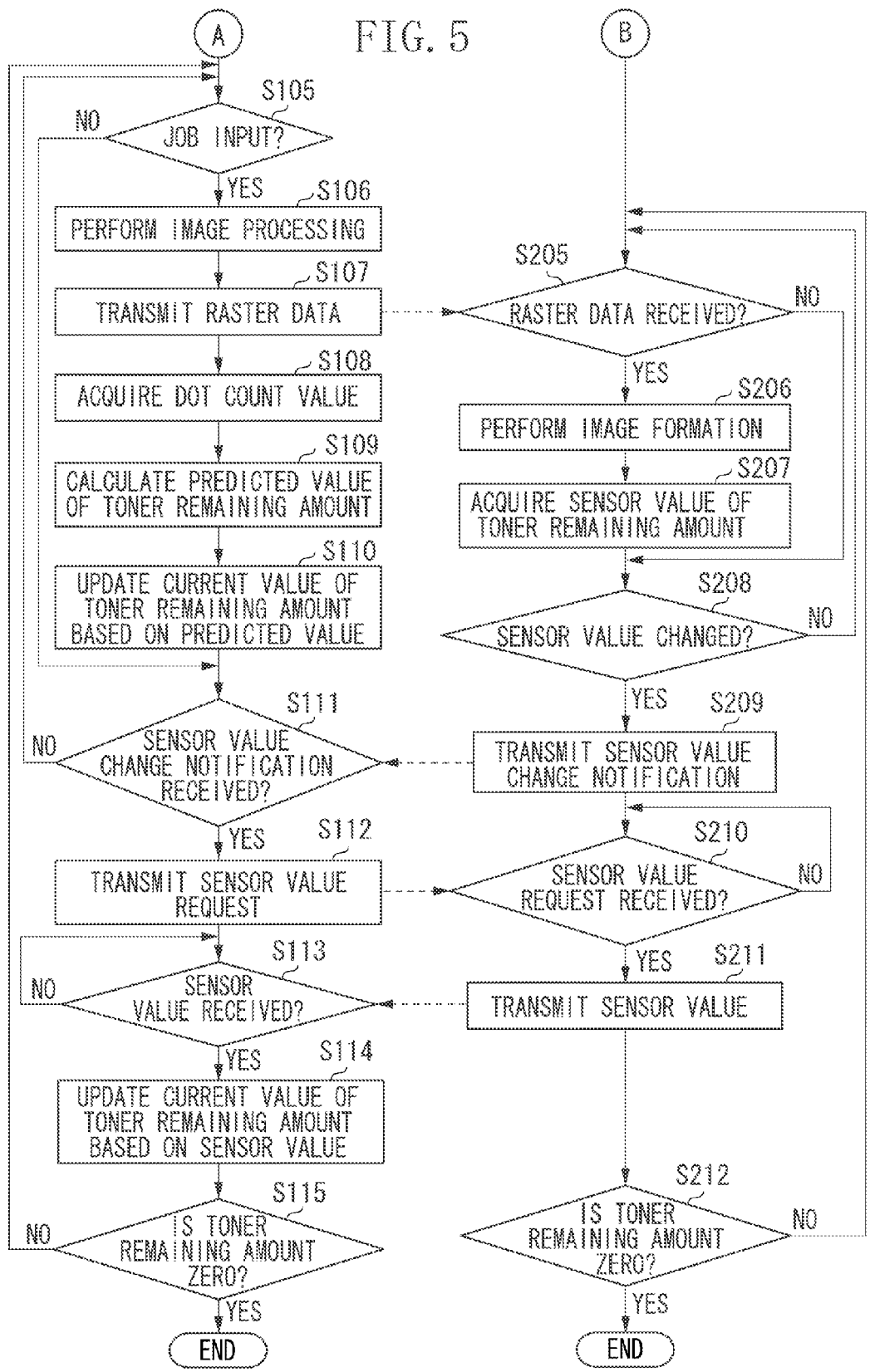
FIG. 5 is a flowchart (last half) illustrating the control for detecting the remaining amount of toner.

FIGS. 4 and 5 are flowcharts illustrating control for detecting the remaining amount of toner.

Control illustrated in the left-hand flowchart is implemented in the controller 302 when the CPU 401 loads a control program stored in the ROM 402 into the RAM 403 and then executes the program. Control illustrated in the right-hand flowchart is implemented in the print engine 303 when the CPU 501 loads a control program stored in the ROM 502 into the RAM 503 and then executes the program.

In step S201, the CPU 501 determines whether the cartridge 509 has been replaced. The CPU 501 makes this determination by detecting whether a new cartridge 509 has been installed into the image forming apparatus 102. When the status change detection unit 506 detects the installation of the new cartridge 509 and notifies the CPU 501 of the installation of the cartridge 509, the CPU 501 recognizes that the cartridge 509 has been installed. The installation of the cartridge 509 may be detected when a cover provided to replace the cartridge 509 is opened or closed, or by using a button or switch which changes the on/off state hardwarewise each time the cartridge 509 is installed or removed. If the cartridge 509 is determined to have been replaced (YES in step S201), the processing proceeds to step S202. On the other hand, if the cartridge 509 is determined to have not been replaced (NO in step S201), the processing waits until the cartridge 509 is replaced.

In step S202, the CPU 501 transmits a cartridge replacement notification indicating that the cartridge 509 has been replaced, to the controller 302 via the controller I/F 507.

In step S101, the CPU 401 determines whether a cartridge replacement notification has been received from the print engine 303 via the engine I/F 406. If the notification is determined to have been received (YES in step S101), the processing proceeds to step S102. On the other hand, if the notification is determined to have not been received (NO in step S101), the processing waits until the notification is received.

In step S102, the CPU 401 transmits a cartridge information request for requesting the cartridge information of the cartridge 509, to the print engine 303 via the engine I/F 406.

In step S203, the CPU 501 determines whether a cartridge information request has been received from the controller 302 via the controller I/F 507. If the request is determined to have been received (YES in step S203), the processing proceeds to step S204. On the other hand, if the request is determined to have not been received (NO in step S203), the processing waits until the request is received.

In step S204, the CPU 501 transmits the cartridge information of the cartridge 509 to the controller 302 via the controller I/F 507.

In step S103, the CPU 401 determines whether the cartridge information has been received from the print engine 303 via the engine I/F 406. If the cartridge information is determined to have been received (YES in step S103), the processing proceeds to step S104. On the other hand, if the cartridge information is determined to have not been received (NO in step S103), the processing waits until the cartridge information is received.

In step S104, the CPU 401 initializes the current value of the remaining amount of toner based on the cartridge information. The current value of the remaining amount of toner refers to a value that is recognized as the remaining amount of toner in the cartridge 509 by the controller 302 and is displayed to the user via the UI 301. More specifically, in initializing the current value of the remaining amount of toner, the CPU 401 refers to the cartridge information and, if the cartridge 509 is determined to be new, the CPU 401 sets the current value of the remaining amount of toner to 100%. If the cartridge 509 cannot be determined to be new, the CPU 401 sets the current value of the remaining amount of toner to a value corresponding to the toner remaining amount information included in the above-described cartridge information. The current value of the remaining amount of toner is stored in the RAM 403.

In step S116, the CPU 401 stores the cartridge manufacturer information based on the cartridge information. The cartridge manufacturer information is used to ensure that the toner remaining amount information can be correctly acquired. This information may or may not include a character string or character string information which indicates that the cartridge 509 is a predetermined cartridge. The cartridge manufacturer information is stored in the RAM 403.

In step S105, the CPU 401 determines whether a job requiring execution of image formation has been input from the data processing apparatus 101 via the external I/F 404. Here, the job is, for example, a PDL print job, a copy job, and a facsimile reception and print job. If the job is determined to have been input (YES in step S105), the processing proceeds to step S106. On the other hand, if the job is determined to have not been input (NO in step S105), the processing proceeds to step S111.

In step S106, based on the job, the CPU 401 performs image processing required for image formation. The image processing includes processing in which the CPU 401 controls the rendering unit 408 to rasterize print data to generate raster data.

In step S107, the CPU 401 transmits the raster data generated by the image processing to the print engine 303 via the engine I/F 406.

In step S108, the CPU 401 acquires from the dot count unit 409 the dot count value measured at the time of generating the raster data. The dot count value may be acquired on a page-by-page basis or on a job-by-job basis.

In step S109, the CPU 401 calculates a predicted value of the remaining amount of toner based on the dot count value acquired in step S108. More specifically, the CPU 401 first performs the following calculation: (the dot count value [dots] in executing the present job or page printing)×(the amount of toner consumption per dot [g/dot])=(the amount of toner to be consumed by executing the present job). The amount of toner consumption per dot may be prestored in the ROM 402 or the ROM 502, or may be included in the cartridge information received in step S103. Then, the CPU 401 performs the following calculation: (the current remaining amount of toner [g])−(the amount of toner to be consumed by executing the present job [g])=(the updated remaining amount of toner [g]). Then, the CPU performs the following calculation: (the updated remaining amount of toner [g])/(the remaining amount of toner in unused cartridge [g])=(the updated predicted value of the remaining amount of toner [%]). The remaining amount of toner in the unused cartridge 509 may be prestored in the ROM 402 or the ROM 502, or may be included in the cartridge information received in step S103.

In step S110, the CPU 401 performs update processing on the current value of the remaining amount of toner based on the predicted value calculated in step S109. If the predicted value calculated in step S109 is equal to or less than the sensor value to be provided next, the CPU 401 stops the update processing on the current value of the remaining amount of toner based on the predicted value until the sensor value is provided.

Meanwhile, in step S205, the CPU 501 determines whether raster data has been received from the controller 302 via the controller I/F 507. If the raster data is determined to have been received (YES in step S205), the processing proceeds to step S206. On the other hand, if the raster data is determined to have not been received (NO in step S205), the processing proceeds to step S208.

In step S206, the CPU 501 controls the image forming unit 508 to perform image formation based on the raster data.

In step S207, the CPU 501 acquires the sensor value of the remaining amount of toner from the toner remaining amount sensor 504. The sensor value may be acquired at the timing of completing image formation on a page-by-page basis or at the timing of completing image formation on a job-by-job basis. The sensor value may also be acquired each time a predetermined time period has elapsed.

In step S208, the CPU 501 determines whether the sensor value acquired this time has changed from the sensor value acquired last time. If the sensor value acquired this time is determined to have changed (YES in step S208), the processing proceeds to step S209. On the other hand, if the sensor value acquired this time is determined to have not changed (NO in step S208), the processing returns to step S205.

In step S209, the CPU 501 transmits a sensor value change notification indicating that the sensor value has changed, to the controller 302 via the controller I/F 507.

In step S111, the CPU 401 determines whether a sensor value change notification has been received from the print engine 303 via the engine I/F 406. If the notification is determined to have been received (YES in step S111), the processing proceeds to step S112. On the other hand, if the notification is determined to have not been received (NO in step S111), the processing returns to step S105.

In step S112, the CPU 401 transmits a sensor value request for requesting a sensor value, to the print engine 303 via the engine I/F 406.

In step S210, the CPU 501 determines whether a sensor value request has been received from the controller 302 via the controller I/F 507. If the request is determined to have been received (YES in step S210), the processing proceeds to step S211. On the other hand, if the request is determined to have not been received (NO in step S210), the processing waits until the request is received.

In step S211, the CPU 501 transmits a sensor value to the controller 302 via the controller I/F 507.

In step S113, the CPU 401 determines whether a sensor value has been received from the print engine 303 via the engine I/F 406. If the sensor value is determined to have been received (YES in step S113), the processing proceeds to step S114. On the other hand, if the sensor value is determined to have not been received (NO in step S113), the processing waits until the sensor value is received.

In step S114, the CPU 401 updates the current value of the remaining amount of toner based on the sensor value received in step S113. At this time, the CPU 401 stores the sensor value acquired this time in the RAM 403. If the sensor value acquired last time is stored, the CPU 401 updates it with the value acquired this time.

In step S115, the CPU 401 determines whether the remaining amount of toner has reached zero, by referring to the current value of the remaining amount of toner. If the remaining amount of toner is determined to have reached zero (YES in step S115), the processing ends. On the other hand, if the remaining amount of toner is determined to have not reached zero (NO in step S115), the processing returns to step S105.

Meanwhile, in step S212, the CPU 501 determines whether the remaining amount of toner has reached zero, by referring to the sensor value of the remaining amount of toner. If the remaining amount of toner is determined to have reached zero (YES in step S212), the processing ends. On the other hand, if the remaining amount of toner is determined to have not reached zero (NO in step S212), the processing returns to step S205.

Figure 6:
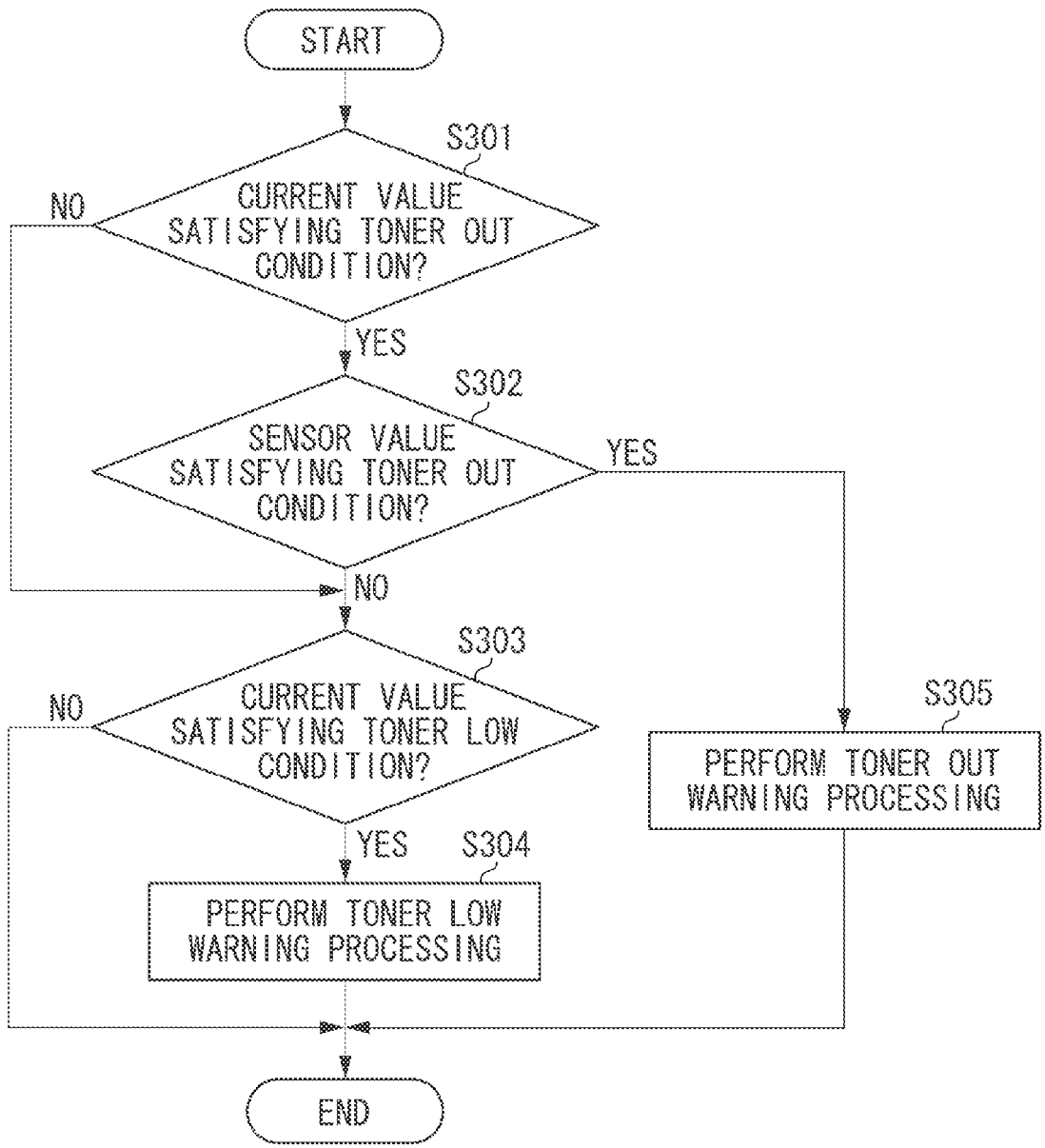
FIG. 6 is a flowchart illustrating control for generating a toner remaining amount warning.

FIG. 6 is a flowchart illustrating control for generating a toner remaining amount warning.

The control illustrated in this flowchart is implemented by the CPU 401 loading a control program stored in the ROM 402 into the RAM 403 and executing the program.

Further, the control illustrated in the flowchart is performed independently of and in parallel with the control described above with reference to FIGS. 4 and 5. The control illustrated in the flowchart may be performed mainly each time a predetermined time period has elapsed, each time a predetermined number of jobs have been executed, or each time printing on a predetermined number of pages has been executed. The control may also be performed at a different timing.

In step S301, the CPU 401 determines whether the current value stored in the RAM 403 satisfies a toner OUT condition. The toner OUT condition is satisfied when the remaining amount of toner is equal to or less than a value, such as 0%, at which continuing the print operation is considered to have been impossible. If the current value is determined to satisfy the toner OUT condition (YES in step S301), the processing proceeds to step S302. On the other hand, if the current value is determined to not satisfy the toner OUT condition (NO in step S301), the processing proceeds to step S303.

In step S302, the CPU 401 determines whether the sensor value stored in the RAM 403 satisfies the toner OUT condition. If the sensor value is determined to satisfy the toner OUT condition (YES in step S302), the processing proceeds to step S305. On the other hand, if the sensor value is determined to not satisfy the toner OUT condition (NO in step S302), the processing proceeds to step S303.

In step S303, the CPU 401 determines whether the current value stored in the RAM 403 satisfies the toner LOW condition. The toner LOW condition is satisfied when the remaining amount of toner is equal to or less than a threshold value, such as 40% or below, at which continuing the print operation is considered to become impossible soon. As described below, the toner LOW threshold value can be changed by the user when a predetermined condition is satisfied. If the current value is determined to satisfy the toner LOW condition (YES in step S303), the processing proceeds to step S304. On the other hand, if the current value is determined to not satisfy the toner LOW condition (NO in step S303), the processing ends.

In step S304, the CPU 401 performs toner LOW warning processing. The toner LOW warning processing refers to displaying, on the UI 301, information indicating that the remaining amount of toner is low or information for prompting the user to prepare a cartridge, and then transmitting these pieces of information to the data processing apparatus 101, without suspending the image forming operation. When performing the toner LOW warning processing, an order may be automatically placed for a new cartridge.

In step S305, the CPU 401 performs toner OUT warning processing. The toner OUT warning processing refers to suspending the image forming operation, displaying, on the UI 301, information indicating that the remaining amount of toner has reached zero or information for prompting the user to replace the cartridge, and then transmitting these pieces of information to the data processing apparatus 101.

Figure 7:
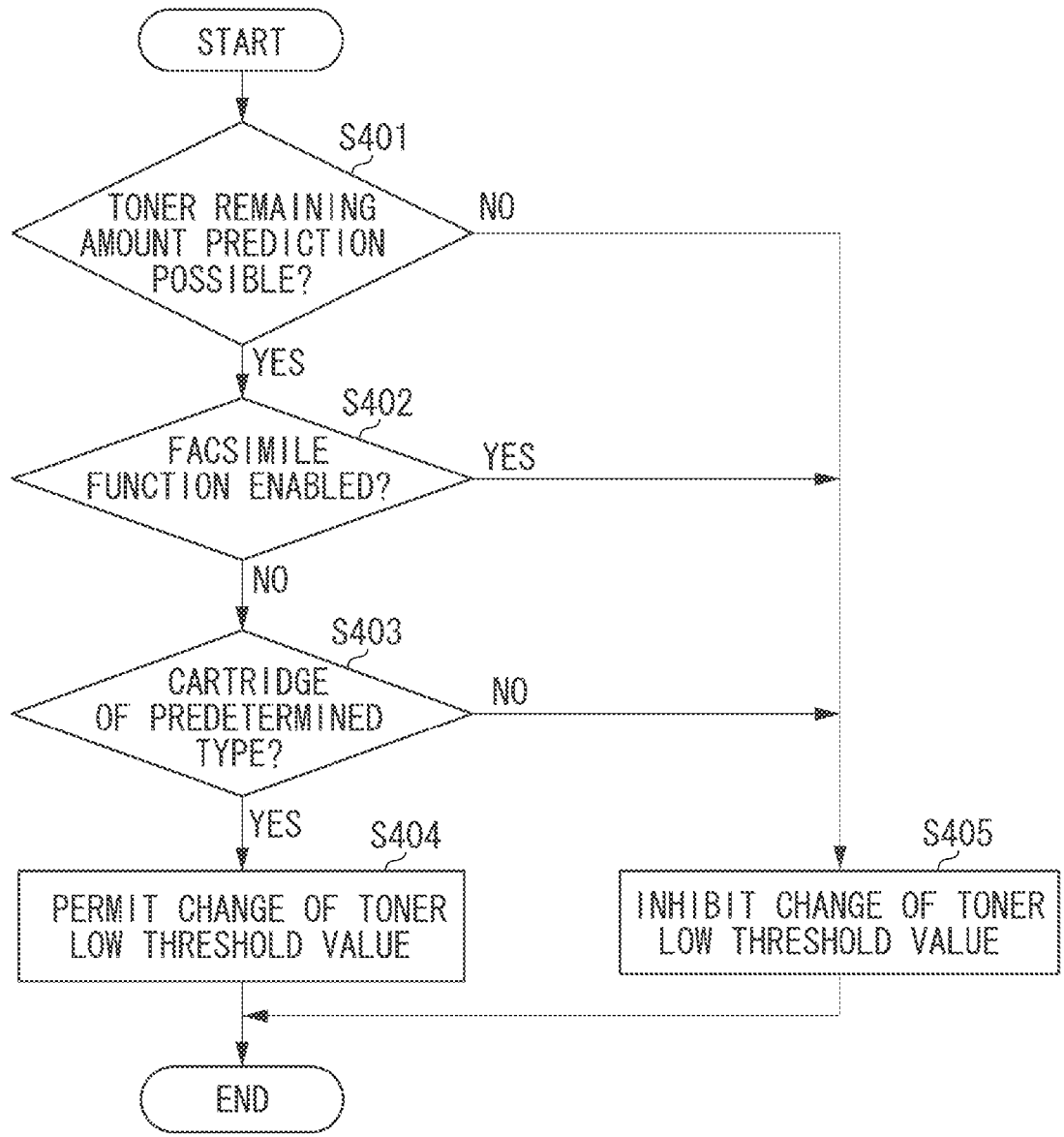
FIG. 7 is a flowchart illustrating control for determining whether to change a toner LOW threshold value.

FIG. 7 is a flowchart illustrating control for determining whether to change the toner LOW threshold value.

The control illustrated in this flowchart is implemented by the CPU 401 loading a control program stored in the ROM 402 into the RAM 403 and executing the program.

Further, the control illustrated in the flowchart is performed independently of and in parallel with the control described above with reference to FIGS. 4, 5, and 6. The control illustrated in the flowchart may be mainly performed at the timing of startup and at the timing of return from the power saving mode. The control may also be performed at a different timing.

In step S401, the CPU 401 determines whether the prediction of the remaining amount of toner is possible. Some models are not provided with the dot count function and therefore are not able to predict the remaining amount of toner. Other models predict the remaining amount of toner based on the page count instead of the dot count. Such models inhibit change of the toner LOW threshold value. If the prediction of the remaining amount of toner is determined to be possible (YES in step S401), the processing proceeds to step S402. On the other hand, if the prediction of the remaining amount of toner is determined to be impossible (NO in step S401), the processing proceeds to step S405.

In step S402, the CPU 401 determines whether the facsimile function is enabled. In some models, the facsimile function is not provided hardwarewise, or is provided but deactivated and inoperable. Such models inhibit change of the toner LOW threshold value. If the facsimile function is determined to be enabled (YES in step S402), the processing proceeds to step S405. On the other hand, if the facsimile function is determined to be not enabled (NO in step S402), the processing proceeds to step S403.

In step S403, the CPU 401 determines whether the toner cartridge is of a predetermined type. More specifically, the CPU 401 acquires the cartridge information (information indicating the type and manufacturer of the toner cartridge) via the engine I/F 406, and determines whether the acquired information includes a specific symbol or character string. If the acquired information includes a specific symbol or character string (YES in step S403), the processing proceeds to step S404. On the other hand, if the acquired information is determined to not include a specific symbol or character string (NO in step S403), the processing proceeds to step S405.

If the acquired information is determined to include a specific symbol or character string (YES in step S403), then in step S404, the CPU 401 permits change of the toner LOW threshold value. More specifically, the CPU 401 displays a setting screen illustrated in FIG. 8 to enable reception of change of the toner LOW threshold value from the user via the setting screen. In step S303 illustrated in FIG. 6, the CPU 401 determines whether the current value satisfies the toner LOW condition, by using as the threshold value a value received via the setting screen illustrated in FIG. 8.

On the other hand, if the prediction of the remaining amount of toner is not possible (NO in step S401), if the facsimile function is enabled (YES in step S402), or if the cartridge is not of the predetermined type (NO in step S403), then in step S405, the CPU 401 inhibits or restricts change of the toner LOW threshold value. More specifically, the CPU 401 does not display the setting screen illustrated in FIG. 8, or displays the setting screen but disables reception of change of the toner LOW threshold value from the user via the setting screen. In step S303 illustrated in FIG. 6, the CPU 401 determines whether the current value satisfies the toner LOW condition, by using a default value as the threshold value.

Figure 8:
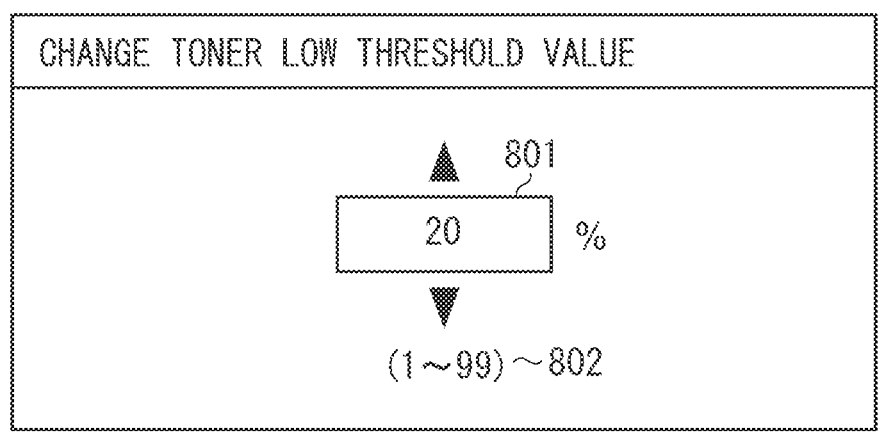
FIG. 8 is an example of a setting screen for changing the toner LOW threshold value.

FIG. 8 illustrates an example of a setting screen for changing the toner LOW threshold value.

This setting screen is displayed on the UI 301 under the control of the CPU 401.

The setting screen displays a toner LOW threshold value 801. This value can be changed by using a keyboard or up and down keys on the UI 301. Although, in this example, the default of the toner LOW threshold value 801 is set to 20%, the value may be set to a different value.

The setting screen also displays a setting range 802 of the toner LOW threshold value 801. Although the toner LOW threshold value 801 can be set within the setting range 802 of 1% to 99% as a default, the lower and upper limit values can be arbitrarily set by an administrator.

In step S303 illustrated in FIG. 6, the CPU 401 determines whether the current value satisfies the toner LOW condition, by using as the threshold value a value received from the user via the above-described setting screen.

Figure 9:
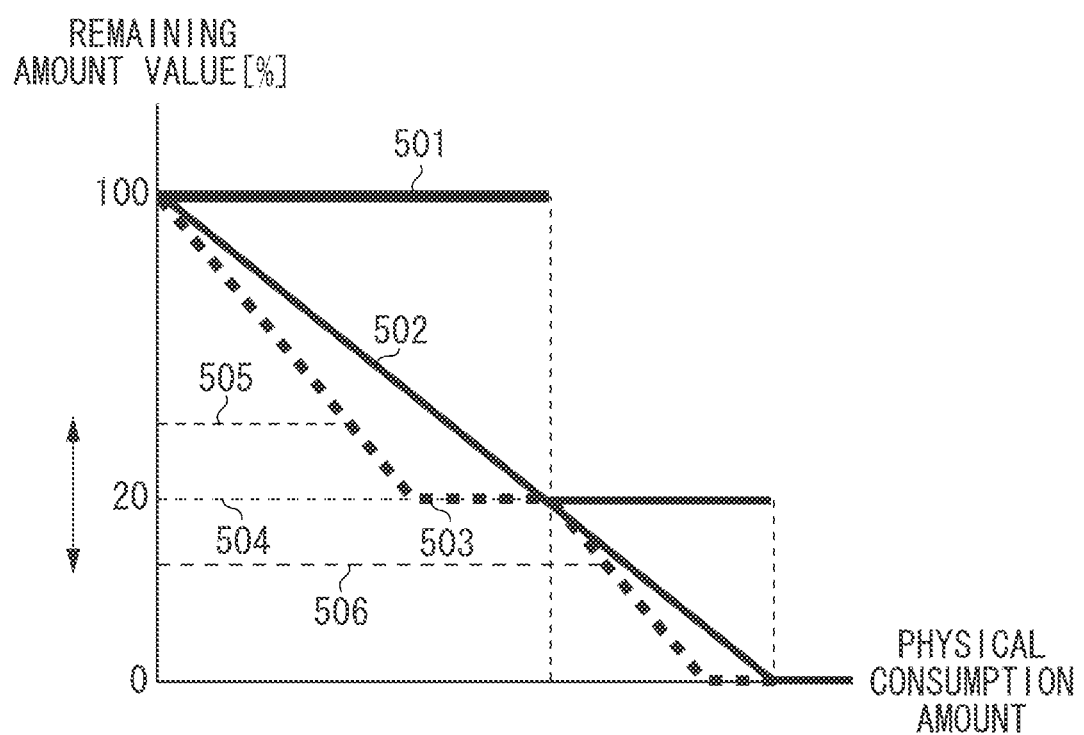
FIG. 9 is a graph illustrating a transition of a current value of the remaining amount of toner.

FIG. 9 is a graph illustrating a transition of the current value of the remaining amount of toner.

A line 501 indicates a value which can be acquired as a sensor value. In the present exemplary embodiment, values of 100%, 20%, and 0% can be acquired as a sensor value.

A line 502 indicates a transition of the actual remaining amount of toner. The actual remaining amount of toner refers to the exact value of the amount of toner actually remaining in the cartridge 509. Directly acquiring the exact value is very difficult unless the sensor is provided with very high accuracy over the entire range, for example.

A line 503 indicates a transition of the current value.

A line 504 indicates a default toner LOW threshold value. This value is one of sensor values.

A line 505 indicates a settable upper limit of the toner LOW threshold value. This value may be determined as a default or arbitrarily set by the administrator.

A line 506 indicates a settable lower limit of the toner LOW threshold value. This value may also be determined as a default or arbitrarily set by the administrator.

The line 506 indicates a toner LOW threshold value when the toner LOW condition is changed.

In a case where the change of the toner LOW threshold value is permitted, the CPU 401 generates a toner LOW warning when the remaining amount of toner has reached a threshold value that is set within the range between the lines 505 and 506. In a case where the change of the toner LOW threshold value is inhibited, the CPU 401 generates a toner LOW warning when the remaining amount of toner has reached the default toner LOW threshold value (line 504).

As described above, in the present exemplary embodiment, the CPU 401 permits change of the toner LOW threshold value if the cartridge is of a predetermined type, and inhibits change of the toner LOW threshold value if the cartridge is not of the predetermined type.

Thus, in the present exemplary embodiment, it is possible to suitably control whether to change the toner LOW threshold value.

The exemplary embodiment of the present invention is also implemented by performing the following processing.

Software (a program) for implementing the functions of the above-described exemplary embodiment is supplied to a system or apparatus via a network or various types of storage media, and a computer (or CPU or microprocessing unit (MPU)) of the system or apparatus reads and executes the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-093603 filed Apr. 30, 2014, which is hereby incorporated by reference herein in its entirety.

What is claimed is:

1. An image forming apparatus comprising:
an image forming unit configured to perform image formation using a recording material;
a notification unit configured to notify a user when a remaining amount of the recording material has reached a threshold value;
a change unit configured to change the threshold value according to an instruction from a user; and
a control unit configured to permit the change unit to change the threshold value if a container containing the recording material is a predetermined container, and to restrict the change unit from changing the threshold value if a container containing the recording material is not the predetermined container.

2. The image forming apparatus according to claim 1, further comprising a determination unit configured to determine whether the container containing the recording material is the predetermined container,
wherein the determination unit acquires information indicating the container containing the recording material, and
wherein the determination unit determines that the container containing the recording material is the predetermined container if a specific character string is included in the acquired information, and determines that the container containing the recording material is not the predetermined container if the specific character string is not included in the acquired information.

3. The image forming apparatus according to claim 1, wherein the predetermined container is a container from a predetermined manufacturer.

4. The image forming apparatus according to claim 1, wherein the predetermined container is a container of a predetermined type.

5. The image forming apparatus according to claim 1, further comprising a reception unit configured to receive an instruction for changing the threshold value from a user,
wherein the change unit changes the threshold value according to the instruction received by the reception unit.

6. The image forming apparatus according to claim 2, further comprising a setting unit configured to set a range of the threshold value that can be received by the reception unit.

7. The image forming apparatus according to claim 1, wherein the notification unit further notifies the user when the remaining amount of the recording material has reached zero.

8. The image forming apparatus according to claim 1, further comprising a prediction unit configured to predict the remaining amount of the recording material.

9. The image forming apparatus according to claim 1, further comprising a detection unit configured to detect the remaining amount of the recording material.

10. A non-transitory computer-readable storage medium storing a program that causes a computer to function as each of the units of the image forming apparatus according to claim 1.

11. The image forming apparatus according to claim 1, wherein the container is a cartridge.

12. A method for controlling an image forming apparatus including an image forming unit configured to perform image formation using a recording material, the method comprising:
notifying a user when a remaining amount of the recording material has reached a threshold value;
changing the threshold value according to an instruction from a user; and
permitting change of the threshold value if a container containing the recording material is a predetermined container, and restricting change of the threshold value if a container containing the recording material is not the predetermined container.

13. An image forming apparatus comprising:
an image forming unit configured to perform image formation using a recording material;
a notification unit configured to notify a user in a case where a value based on an remaining amount of the recording material in a container satisfies a predetermined condition;
a change unit configured to change the predetermined condition according to an instruction from a user; and
a control unit configured to permit the change unit to change the predetermined condition if the container is a predetermined container, and to restrict the change unit from changing the predetermined condition if the container is not the predetermined container.

14. The image forming apparatus according to claim 13, wherein the predetermined condition is a predetermined amount of a recording material.

15. The image forming apparatus according to claim 13, wherein the predetermined condition is a predetermined remaining ratio of a recording material.

16. The image forming apparatus according to claim 13, wherein the value based on the remaining amount of the recording material is a predicted value based on dot count values of raster data which is generated in the image forming apparatus.

17. The image forming apparatus according to claim 13, wherein the value based on the remaining amount of the recording material is a value based on a sensor value acquired by a sensor which detects a remaining amount of a recording material.

18. The image forming apparatus according to claim 13, further comprising a determination unit configured to determine whether the container containing the recording material is the predetermined container,
wherein the determination unit acquires information indicating the container containing the recording material, and
wherein the determination unit determines that the container containing the recording material is the predetermined container if a specific character string is included in the acquired information, and determines that the container containing the recording material is not the predetermined container if the specific character string is not included in the acquired information.

19. The image forming apparatus according to claim 13, wherein the predetermined container is a container from a predetermined manufacturer.

20. A method of controlling an image forming apparatus, the method comprising:
- performing image formation using a recording material;
- notifying a user in a case where a value based on an remaining amount of the recording material in a container satisfies a predetermined condition;
- changing the predetermined condition according to an instruction from a user; and
- permitting the change of the predetermined condition if the container is a predetermined container, and to restrict changing the predetermined condition if the container is not the predetermined container.

* * * * *